(12) United States Patent
Lemmons et al.

(10) Patent No.: US 9,100,461 B2
(45) Date of Patent: Aug. 4, 2015

(54) AUTOMATICALLY PUBLISHING STREAMS TO MULTIPLE DESTINATIONS

(71) Applicant: Wowza Media Systems, LLC, Evergreen, CO (US)

(72) Inventors: Thomas R. Lemmons, Evergreen, CO (US); Charles F. Good, Cincinnati, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 13/842,692

(22) Filed: Mar. 15, 2013

(65) Prior Publication Data
US 2014/0281007 A1  Sep. 18, 2014

(51) Int. Cl.
| G06F 15/173 | (2006.01) |
| H04L 29/06 | (2006.01) |
| H04N 21/235 | (2011.01) |
| H04N 7/173 | (2011.01) |
| G06Q 30/00 | (2012.01) |

(52) U.S. Cl.
CPC .......... *H04L 65/4092* (2013.01); *H04L 65/602* (2013.01); *H04L 65/608* (2013.01); *H04N 21/2355* (2013.01); *H04L 65/4084* (2013.01)

(58) Field of Classification Search
CPC  H04L 65/602; H04L 65/608; H04N 21/2343; H04N 21/2355
See application file for complete search history.

(56) References Cited

U.S. PATENT DOCUMENTS

| 6,732,162 | B1 * | 5/2004 | Wood et al. ................... 709/219 |
| 7,676,591 | B2 * | 3/2010 | Chan et al. .................... 709/231 |
| 8,150,918 | B1 |   4/2012 | Edelman et al. |
| 8,265,612 | B2 * | 9/2012 | Athsani et al. ............. 455/414.2 |
| 8,339,456 | B2 | 12/2012 | Eledath et al. |
| 2006/0271977 | A1 * | 11/2006 | Lerman et al. ................... 725/88 |
| 2008/0103906 | A1 * | 5/2008 | Singh .............................. 705/14 |
| 2008/0305832 | A1 * | 12/2008 | Greenberg .................... 455/557 |
| 2009/0300202 | A1 | 12/2009 | Hogan et al. |
| 2011/0173345 | A1 | 7/2011 | Knox et al. |
| 2014/0215541 | A1 * | 7/2014 | Horen et al. .................. 725/109 |

OTHER PUBLICATIONS

"How to Get PushPublishing AddOn"; http://www.wowza.com/forums/content.php?109; retrieved Mar. 12, 2013; 5 pages.
Wowza Media Systems: Push Publishing; http://www.wowza.com/addons/pushpublishing; retrieved Mar. 12, 2013; 5 pages.
"Sorenson Squeeze: Publishing Options Overview"; http://forum.sorensonmedia.com/forum/content.php?152-Publishing-Options-Overview; retrieved Mar. 12, 2013; 3 pages.

* cited by examiner

Primary Examiner — Wen-Tai Lin
(74) Attorney, Agent, or Firm — Toler Law Group, PC

(57) ABSTRACT

Systems and methods of automatically publishing a stream to multiple destinations are disclosed. A media server receives a stream and identifies a plurality of entries in a publishing map stored at the media server, where the each of the plurality of entries is associated with the stream. A first entry of the plurality of entries identifies a first publishing destination and a second entry of the plurality of entries identifies a second publishing destination that is different from the first publishing destination. The media server automatically publishes the stream to the first publishing destination and to the second publishing destination.

18 Claims, 5 Drawing Sheets

PUBLISHING MAP — 162

```
#format:
#[incoming stream name] = {Profile:[profile], [additional configuration items]}

LiveStream1 = {profile:"rtmp", streamName:"LiveStream1RTMP", host:"localhost", username:"user1", password:"user1pw"} —— 201
LiveStream1 = {profile:"mpegts", streamName:"LiveStream1MPEGTS", host:"239.1.1.1", port:10000} —— 202
LiveStream1 = {profile:"rtp", streamName:"LiveStream1RTP", host:"239.1.1.1", videoport:10002, audioport:10004} —— 203
LiveStream1_240p = {profile:"CDN2", streamName:"LiveStream1_240p", adaptivestreaming:true} —— 204
LiveStream1_480p = {profile:"CDN2", streamName:"LiveStream1_480p", adaptivestreaming:true} —— 205
LiveStream1_720p = {profile:"CDN2", streamName:"LiveStream1_720p", adaptivestreaming:true} —— 206

LiveStream2 = {profile:"CDN1", streamName:"LiveStream2", streamID:12345, username:"user1", password:"user1pw",
    sendOriginalTimecodes:true, originalTimecodeThreshold:0x100000} —— 207
LiveStream2 = {profile:"mpegts", streamName:"LiveStream2MPEGTS", host:"239.1.1.1", port:10010} —— 208
```

FIG. 2

AUTOMATICALLY PUBLISHING STREAMS TO MULTIPLE DESTINATIONS

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

To enable viewers to view video content, a content creator may publish the video content. For example, a user may upload a video clip to a website and may provide friends and family a link to the video clip hosted at the website. If the video content is a stream (e.g., a webcam feed), the user may send the stream to a stream server and may provide friends and family with a link to the stream server. When the user creates another video clip or stream, the user may once again have to manually configure where and how the video clip or stream is to be published.

SUMMARY

Systems and methods of automatically publishing streams (e.g., audio and/or video streams) are disclosed. For example, the described techniques may be implemented by a push publishing module at a media server. The media server may store a publishing map. When the media server receives a stream, the media server may search entries of the publishing map to determine whether a stream name of any of the entries matches a name of the stream. When the names match, the media server may automatically publish the stream to a publishing destination identified by the matching entry. The entry may include publishing information for the publishing destination, such as a user name and password, a host address, a port number, etc. The publishing destination may be another media server, a stream relay server, a publishing entrypoint of a content delivery network (CDN), a playback device, a multicast network, an Internet service, etc.

When multiple entries match the received stream, the media server publishes the received stream to multiple publishing destinations. Moreover, the publishing map can include entries for different stream names. When multiple streams being received by the media server match entries in the publishing map, the media server may publish each stream to multiple publishing destinations. The described techniques may therefore enable automatic push publication of multiple received streams to multiple publishing destinations at the same time.

BRIEF DESCRIPTION OF THE DRAWINGS

FIG. 2 is a diagram to illustrate a particular embodiment of a publishing map that may be used by the system of FIG. 1;

DETAILED DESCRIPTION

Figure 1:
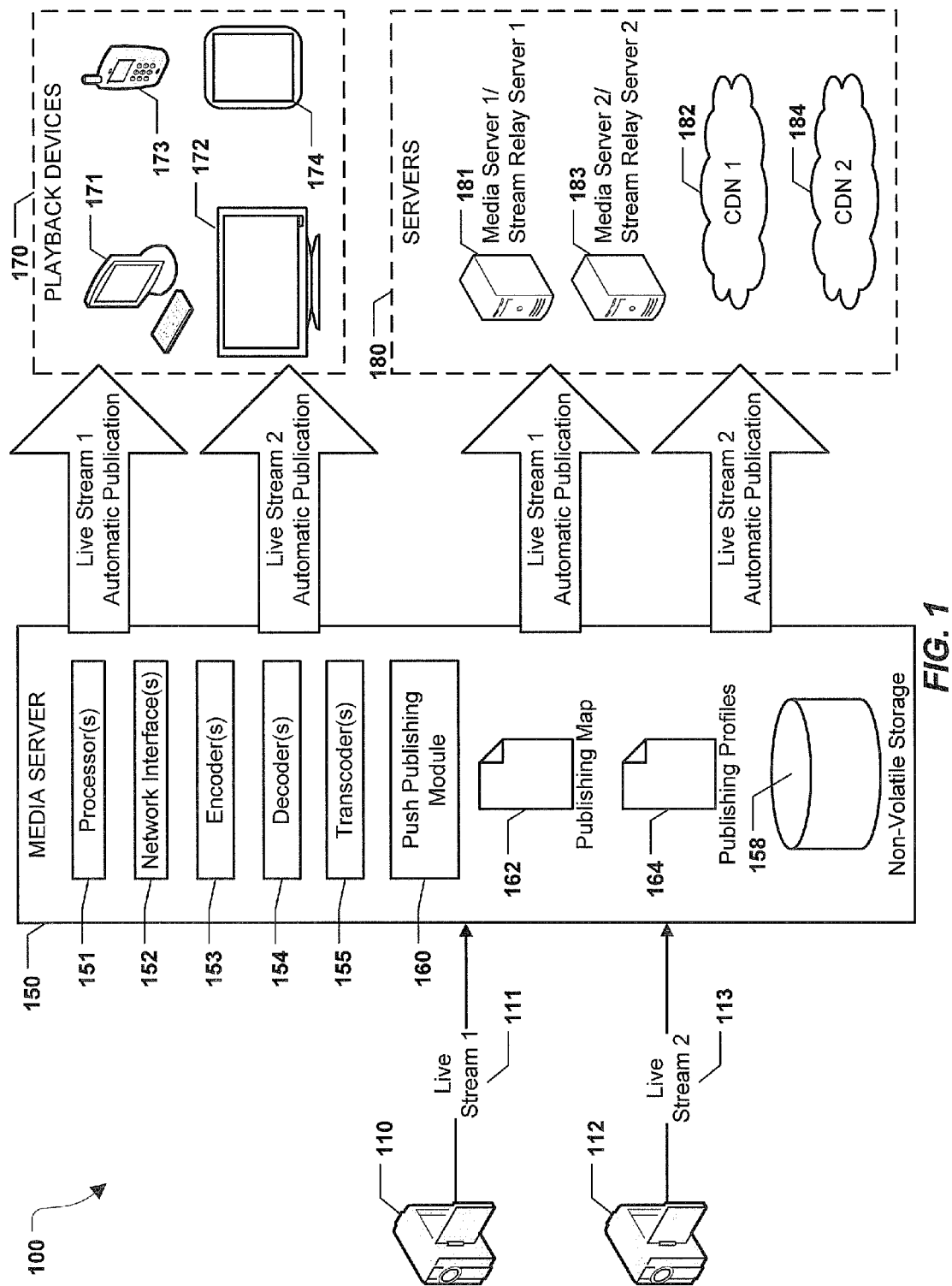
FIG. 1 is a diagram of a particular embodiment of a system that is operable to automatically publish a stream to multiple destinations.

FIG. 1 is a diagram of a particular embodiment of a system 100 that is operable to automatically publish a stream to multiple destinations. The system 100 includes a media server 150. The media server 150 is configured to send and receive data from various other devices (e.g., via a network, such as a local area network (LAN) or the Internet). For example, the media server 150 may communicate with one or more playback devices 170 (e.g., devices that are configured to output a display of a stream of content) and one or more other servers 180.

The media server 150 may include one or more processors 151 and various components that are executable by the processor(s) 151. The media server 150 may correspond to software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof.

The media server 150 may be accessible via a network (e.g., the Internet). The media server 150 may be located at a content distribution site, may be part of a cloud network or content delivery network (CDN), may be located in an individual customer or user premises, or may be in some other location. The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an Institute of Electrical and Electronics Engineers (IEEE) 802.11 (e.g., Wi-Fi) protocol, or other wired or wireless interfaces. In the embodiment of FIG. 1, the media server 150 receives a first live stream 111 from a first source 110 (e.g., a first camera) and a second live stream 113 from a second source 112 (e.g., a second camera). The live streams 111, 113 may be received by the media server 150 simultaneously. For example, the live streams 111, 113 may be received at different input ports of network interface(s) 152.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). Although one or more embodiments described herein are associated with automatic push publishing of "live" streams, the described techniques may be used with other types of streams received by the media server 150 (e.g., VOD streams). Alternately, or in addition, automatic push publishing may be performed with respect to streams generated by the media server 150 based on local content stored at the media server 150 (e.g., content stored in the non-volatile storage 158).

The media server 150 may also include one or more encoders 153, decoders 154, and transcoders 155, each of which may be implemented using hardware or software. For example, one or more of the encoder(s) 153, decoder(s) 154, and transcoder(s) 155 may be implemented using Java classes (e.g., executable by a Java Virtual Machine (JVM)), C++ instructions, C instructions, etc. The decoder(s) 154 may decode data received by the media server 150. For example, the decoder(s) 154 may decode received streams (e.g., live audio-only, video-only, or audio-video streams) and files (e.g., VOD items). The encoder(s) 153 may encode data that is to be transmitted by the media server 150. The transcoder(s) 155 may be configured to perform bitrate conversion, CODEC conversion, frame size conversion, etc. Depending on a format of a received stream, a playback format supported by a requesting device, and/or transcoding parameters in use, a transcoding operation performed by the transcoder(s) 155 may trigger a decoding operation by the decoder(s) 154 and/or a re-encoding operation by the encoder(s) 153. In a particular embodiment, parameters used by the transcoder(s) 155 are stored in one or more transcoding templates at the media server 150. The encoder(s) 153, decoder(s) 154, and transcoder(s) 155 may thus enable the media server 150 to process data in accordance with multiple coding technologies and protocols.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

In accordance with the described techniques, the media server 150 may include a push publishing module 160. For example, the push publishing module 160 may be a software plug-in that is purchased and installed at the media server 150 to provide push publishing functionality. The push publishing module 160 may be associated with one or more configuration files. For example, in FIG. 1, the push publishing module 160 is associated with a publishing map 162 and publishing profiles 164. In a particular embodiment, the publishing map 162 is a text file and the publishing profiles 164 are stored as one or more XML files.

The publishing map 162 may include one or more entries. Each of the entries may include a stream name and an identifier of a publishing profile (e.g., corresponding to one of the publishing profiles 164). For example, each entry of the publishing map 162 may be of the format "[stream name]={Profile:[profile], [additional configuration items]}." The identity and value of the additional configuration items may depend on the publishing profile identified in the entry. For example, the additional configuration items may include information that can be used to publish a live stream to a publishing destination, such as a host address, a port number, authentication information (e.g., a user name, a password, and/or a stream identifier assigned by a publishing target), etc. An example of the publishing map 162 is further described with reference to FIG. 2.

In a particular embodiment, the publishing profiles 164 include a profile for each of a plurality of protocols and/or publishing destinations. For example, the media server 150 may support push publishing via a variety of protocols (e.g., RTMP, RTP, MPEG-TS, etc.) to a variety of publishing destinations. Publishing destinations may include individual playback devices 170, such as a laptop or desktop computing device 171, a television or set-top box 172, a smartphone (or wireless telephone) 173, and a tablet computer 174. Publishing destinations may also include servers 180 or stream relay devices, such as a first media server or stream relay server 181, a second media server or stream relay server 183, a server (e.g., an edge server or a publishing entrypoint server) of a first CDN 182, a server (e.g., an edge server or a publishing entrypoint server) of a second CDN 184, etc. Publishing destinations may further include multicast networks and Internet streaming/hosting services or websites. Examples of the publishing profiles 164 are further described with reference to FIG. 3.

During operation, the media server 150 may receive the first live stream 111 and the second live stream 113. The live streams 111, 113 may be processed by the decoder(s) 154, transcoder(s) 155, and/or encoder(s) 153. After receipt of a portion of the live streams 111, 113 (or after completion of processing of a portion of the live streams 111, 113 at the media server 150), the push publishing module 160 may determine whether the live streams 111,113 match any of the entries in the publishing map 162. For example, the first live stream 111 may have a name "LiveStream1" and the second live stream 113 may have a name "LiveStream2." For example, a live stream may include a stream name in stream metadata or in a packet header. The push publishing module 160 may search for the names "LiveStream1" and "LiveStream2" in the publishing map 162. If an entry in the publishing map 162 matches the name "LiveStream1," the push publishing module 160 may automatically publish the first live stream 111 to a publishing destination identified by the entry. Similarly, if an entry in the publishing map 162 matches the name "LiveStream2," the push publishing module 160 may automatically publish the second live stream 113 to a publishing destination identified by the entry. Multiple entries in the publishing map 162 may be a match for each of the live streams 111, 113. Thus, the push publishing module 160 may enable push publishing of multiple live streams to multiple publishing destinations at the same time.

In a particular embodiment, the media server 150 is configured to support adaptive streaming. Adaptive streaming is a media transmission mechanism that enables a receiving device to dynamically request different versions of a stream in response to changing network conditions. For example, one of the playback devices 170 may initiate an adaptive streaming session with the media server 150. The media server 150 may send a manifest to the initiating device, where the manifest describes each of a plurality of renditions of a stream that are available for adaptive streaming. As used herein, a "rendition" of a stream may correspond to a particular version of the stream. Each rendition of the stream may have a different bitrate (e.g., video bitrate and/or audio bitrate). Renditions may also differ from each other with respect to other audio and video quality parameters, such as frame size, frame rate, video CODEC, audio CODEC, number of audio channels, etc. Upon receiving the manifest, the computing device 171 may determine which of the available renditions of the live stream 111 should be requested from the media server 150. For example, the computing device 171 may make such a determination based on buffering/processing capability at the computing device 171 and/or network conditions being experienced by the computing device 171. Upon determining which rendition should be requested, the computing device 171 may transmit a request to the media server 150. The request may specify a particular portion (e.g., portion "X") of the requested rendition. Depending on the adaptive streaming protocol in use, the requested portion may correspond to a "chunk" of a rendition and/or a group of pictures (GOP). A "chunk" may refer to a fixed length duration (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 171 may request a subsequent portion (e.g., portion "X+1") of the same rendition of the live stream 111. However, if playback and/or network conditions become worse, the computing device 171 may switch to a lower bitrate rendition by requesting subsequent portions of the lower bitrate rendition. Conversely, if playback and/or network conditions improve, the computing device 171 may switch to a higher bitrate rendition. The transcoder(s) 155 may generate key frame aligned portions for the adaptive streaming renditions, so that switching to a lower bitrate or higher bitrate rendition appears "seamless" (e.g., does not result in noticeable visual glitches or dropped frames at the computing device 171).

When the media server 150 supports adaptive streaming of the first live stream 111 or the second live stream 113, the media server 150 may generate multiple renditions of the first live stream 111 or the second live stream 113. Each of the renditions may have a different, programmatically determined, stream name. For example, a "240p" rendition, a "480p" rendition, and a "720p" rendition of the first live stream 111 may have the stream names "LiveStream1_240p," "LiveStream1_480p," and "LiveStream1_720p," respectively. The push publishing module 160 may support automatic push publishing of multiple renditions of a live stream. For example, the publishing map 162 may include one or more entries that match the stream name of each of the renditions of the live stream 111. Thus, the push publishing module 160 may also support automatic push publication of adaptive bitrate renditions of live streams to multiple publication destinations.

FIG. 2 is a diagram to illustrate a particular embodiment of the publishing map 162 of FIG. 1. In the embodiment of FIG. 2, each entry in the publishing map 162 has the format "[incoming stream name]={Profile:[profile], [additional configuration items]}." The publishing map 162 includes eight entries 201-208. In alternate embodiments, the publishing map 162 may include more than eight or fewer than eight entries.

The first three entries 201-203 of the publishing map 162 include the incoming stream name "LiveStream1." Thus, the push publishing module 160 of FIG. 1 may determine that each of the first three entries 201-203 matches the first live stream 111. The first entry 201 indicates a profile "rtmp." Thus, the push publishing module 160 may use an "rtmp" profile (e.g., one of the publishing profiles 164 of FIG. 1) to determine how to publish the first live stream 111 to a first publishing destination. The first entry 201 also includes additional configuration items to be used during publishing, such as an outgoing stream name "LiveStream1RTMP," and information indicating that the outgoing stream is to be published to the host "localhost" (i.e., the media server 150) using a user name "user1" and a password "user1pw." The second entry 202 indicates a profile "mpegts" and indicates that an outgoing stream named "LiveStream1MPEGTS" is to be published to a port 10000 of a host at the Internet protocol (IP) address "239.1.1.1." The third entry 203 indicates a profile "rtp" and indicates that an outgoing stream named "LiveStream1RTP" is to be published to the video port 10002 and audio port 10004 of the host "239.1.1.1." In response to determining that each of the first three entries 201-203 matches the first live stream 111, the push publishing module 160 may cause the media server 150 to generate and publish the streams. For example, the media server 150 may generate and transmit packets of the first live stream 111 in accordance with the RTMP, MPEG-TS, and RTP protocols.

The publishing map 162 also includes adaptive streaming entries 204-206 for three renditions of the first live stream 111, each of which identifies a "CDN2" profile corresponding to the second CDN 184 of FIG. 1. In alternate embodiments, more than three or fewer than three adaptive streaming renditions may be supported. When adaptive streaming is enabled and renditions having the names "LiveStream1_240p," "LiveStream1_480p," and "LiveStream1_720p" are generated at the media server 150, the push publishing module 160 may automatically publish the renditions to a publishing entrypoint of the second CDN 184.

The publishing map 162 also includes entries 207-208 for the second live stream 113 (e.g., having the incoming stream name "LiveStream2"). The entry 207 indicates that the push publishing module 160 will automatically publish the second live stream 113 to the first CDN 182 of FIG. 1 using an outgoing stream name of "LiveStream2," a stream identifier of 12345, a username "user1," and a password "user1pw." In accordance with the entry 207, the push publishing module 160 sends original timecodes (e.g., timecodes included in the received second live stream 113) using a timecode threshold of 0x100000. Sending original timecodes may enable a publishing destination to implement adaptive bitrate streaming. Use of a timecode threshold may enable compatibility with certain publishing destinations (e.g., by adjusting timecode magnitude). The entry 208 indicates that the push publishing module 160 will also publish the second live stream 113 to port 10010 of the host "239.1.1.1" using a stream name of "LiveStream2MPEGTS" using the MPEG-TS protocol.

It should be noted that the publishing entries and items/attributes illustrated in FIG. 2 are for example only. Different publishing entries and items/attributes may also, or in the alternative, be used during push publishing. For example, entries in the publishing map 162 may include items/attributes such as an application name, an application instance, an application ID, an authentication key, a uniform resource locator (URL) a secure token to use when connecting to a remote server, options to register callbacks to particular software classes/functions/methods before publishing begins and after publishing ends, a CODEC version, a query string that is added to a URL as part of a connection to a publishing destination, an indication of whether or not to generate debug logs or packet logs, other information related to publishing a live stream, or any combination thereof.

When a multicast network is used as a publishing destination, an entry may also include a multicast time to live (TTL) for user datagram protocol (UDP) packets. In a particular embodiment, an entry may include an option to wrap (e.g., encapsulate) MPEG-TS packets in RTP packets. If a CDN includes backup servers, an entry may include an option to publish to the backup servers instead of, or in addition to, publishing servers of the CDN.

Figure 3:
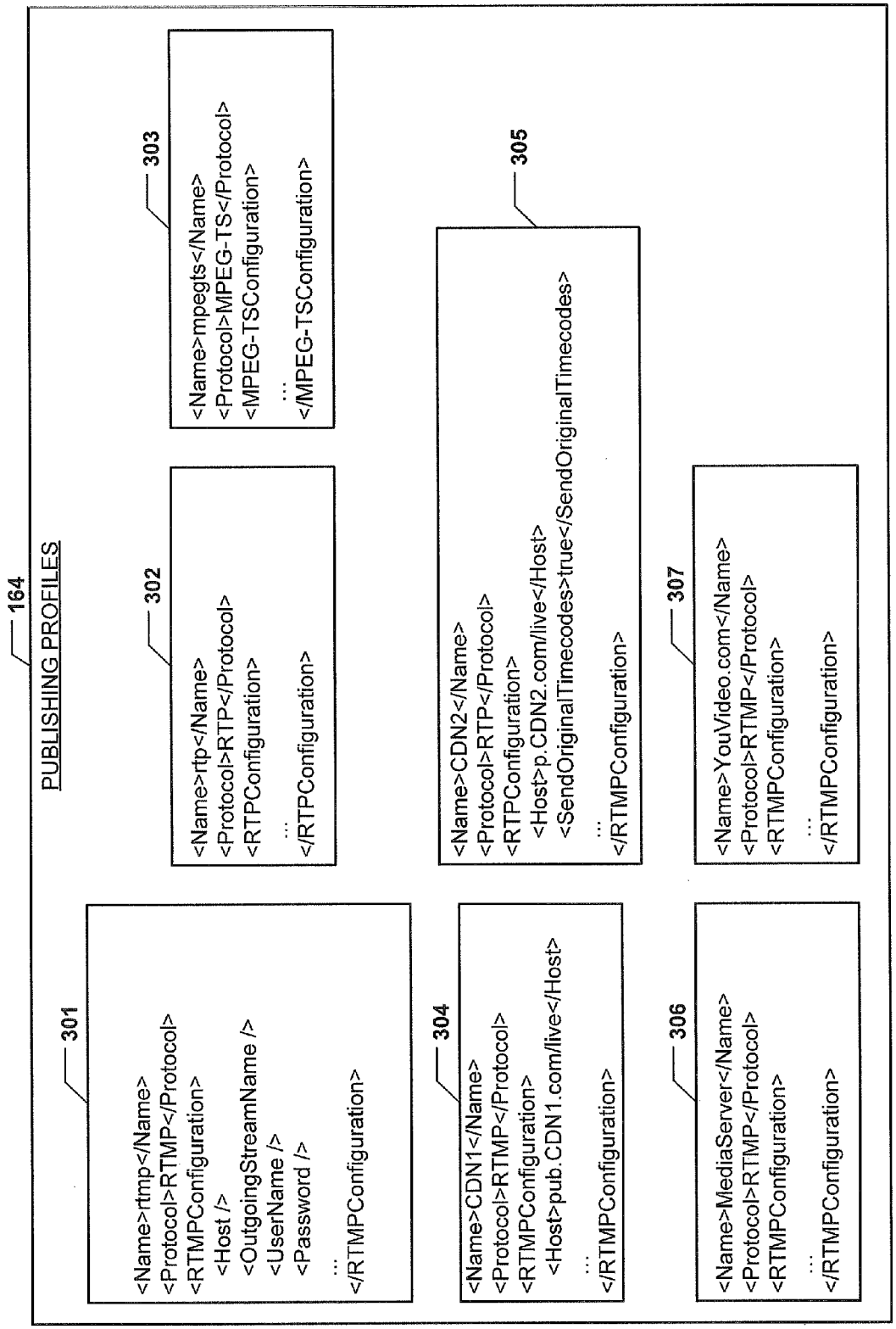
FIG. 3 is a diagram to illustrate a particular embodiment of publishing profiles that may be used by the system of FIG. 1.

FIG. 3 is a diagram to illustrate a particular embodiment of the publishing profiles 164 of FIG. 1. In the embodiment of FIG. 3, the publishing profiles 164 include seven publishing profiles 301-307. In alternate embodiments, more than seven or fewer than seven publishing profiles may be stored at the media server 150 of FIG. 1.

Each of the publishing profiles 301-307 may identify a protocol and/or publishing destination via a "Name" attribute, as shown. For example, the first three profiles 301-303 are associated with the RTMP, RTP, and MPEG-TS protocols, respectively. Each of the profiles 301-303 includes a list of configuration attributes for the respective protocol. The list of configuration attributes corresponds to the "[additional configuration items]" that are inserted in an entry of the publishing map 162 that indicates the profile. For example, the entry 201 in FIG. 2 includes the profile name "rtmp" and also includes an outgoing stream name, a host, a user name, and a password. Thus, the list of configuration attributes in the first profile 301 may at least include "<OutgoingStreamName />," "<Host />," "<UserName />," and "<Password />." Additional configuration attributes, such as those described with reference to FIG. 2, may also be included.

In a particular embodiment, configuration attributes in a profile may include default values, so that the values do not have to be included in each entry of the publishing map 162 that uses the profile. For example, the profile 304, named "CDN1," includes a host attribute value of "pub.CDN1.com/live," and the profile 305, named "CDN2," includes a host attribute value of "p.CDN2.com/live." Thus, the push publishing module 160 may automatically publish live streams to the "pub.CDN1.com/live" address or to the "p.CDN2.com/live" address when an entry in the publishing map 162 indicates the "CDN1" profile or the "CDN2" profile, even if the entry does not specify a host. The push publishing module 160 may also send original timecodes when publishing to the second CDN 184, as indicated by the profile 305.

The publishing profiles 164 may also include publishing profiles for other types of publishing destinations. For example, the profile 306 may correspond to a media server, and the profile 307 may correspond to an Internet streaming/hosting service called "YouVideo.com"

As illustrated in FIGS. 2-3, the publishing map 162 and the publishing profile 164 may enable an owner or administrator of the media server 150 to set up automatic publication of received streams to one or more publishing destinations based on the name of the received streams. Any stream having a name that matches an entry may be published automatically. Automatic publishing of episodic or periodic content may be performed without reconfiguration of the publishing map 162. As an example, live video feeds corresponding to college courses may be automatically published. To illustrate, a course Computer Science 101 may be taught from 10 am to 11 am on Mondays, Wednesdays, and Fridays. A camera in the classroom may capture a live stream each Monday, Wednesday, and Friday and send the live stream to the media server 150. The live stream may have the same name (e.g., "CS101") regardless of date and day of the week. Because the live stream has the same name, a single entry in the publishing map 162 may be used to automatically publish the video feed from the classroom to publishing destinations each Monday, Wednesday, and Friday morning.

In a particular embodiment, matching of stream names may support the use of wildcards and regular expressions. For example, if an entry in the publishing map 162 includes the stream name "Stream*" and "*" is a wildcard that can be replaced by zero or more characters, both "Stream1" and "Stream2" match the entry. In alternate embodiments, other properties of the received stream, such as a source identifier, a CODEC, or a resolution, may be matched against entries in the publishing map 162 instead of, or in addition to, the stream name. Further, the publishing map 162 and/or publishing profiles 164 may be modified during runtime at the media server 150, thereby enabling a user to modify a publishing destination without having to reboot or reinitialize the media server 150. Moreover, because the publishing map 162 and the publishing profiles 164 are modifiable files (e.g., text files and/or XML files), push publication may be implemented and adjusted without writing executable code. In a particular embodiment, the media server 150 may generate a graphical user interface (GUI) that is operable to edit the publishing map 162 and/or the publishing profiles 164.

Figure 4:
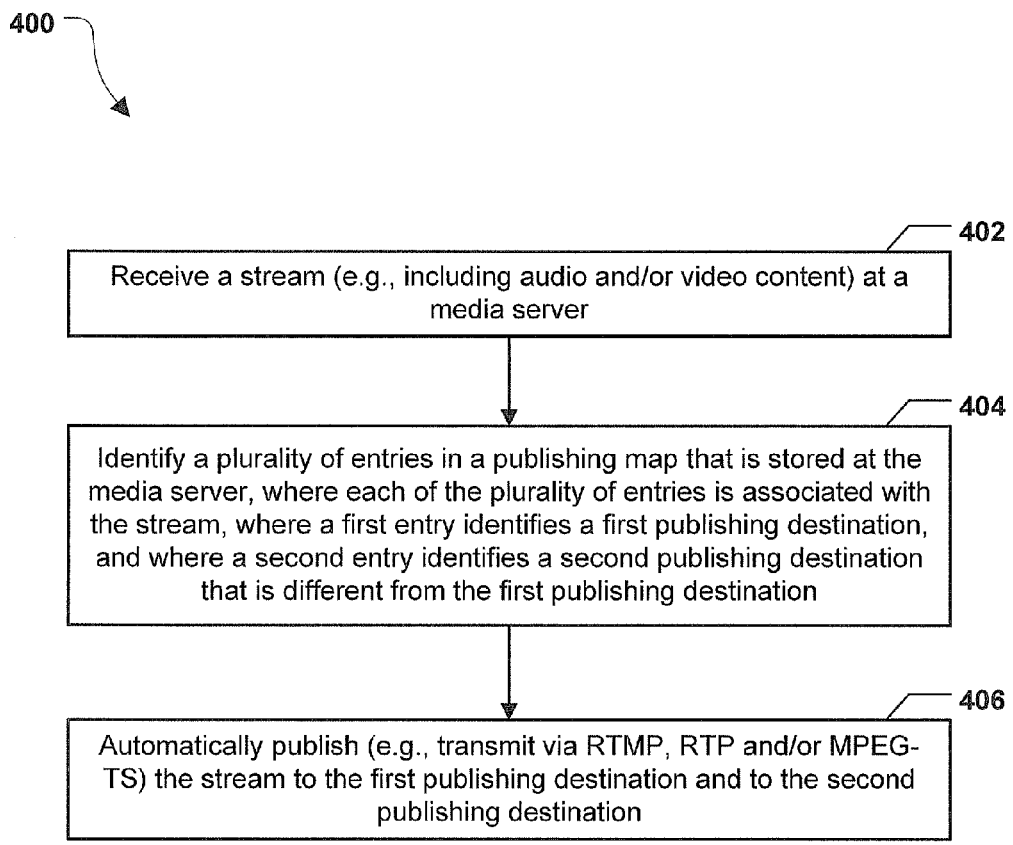
FIG. 4 is a flowchart to illustrate a particular embodiment of a method of automatically publishing a stream to multiple destinations.

FIG. 4 is a flowchart of a particular embodiment of a method 400 of automatically publishing a stream to multiple destinations. In an illustrative embodiment, the method 400 may be performed by the media server 150 of FIG. 1.

The method 400 may include receiving a stream at a media server, at 402. The stream may include audio and/or video content. For example, in FIG. 1, the media server 150 may receive the first live stream 111. Alternately, the media server 150 may receive a VOD stream or may generate a stream based on content stored at the media server 150.

The method 400 may also include identifying a plurality of entries in a publishing map stored at the media server, at 404. Each of the plurality of entries is associated with the stream. For example, the plurality of entries may be identified based a match between a name of the received stream and a stream name in each of the plurality of entries. A first entry may identify a first publishing destination and a second entry may identify a second publishing destination that is different from the first publishing destination. For example, in FIG. 1, the push publishing module 160 may identify a plurality of entries in the publishing map 162 that match the received live stream 111, where each of the entries identifies a different publishing destination.

The method 400 may further include automatically publishing the stream to the first publishing destination and to the second publishing destination, at 406. Publishing the stream may include transmitting the stream in accordance with a protocol identified in the entry and/or by a profile identified by the entry (e.g., the RTMP, RTP, and/or MPEG-TS protocols). For example, in FIG. 1, the push publishing module 160 may automatically publish the live stream 111 to multiple publishing destinations, such as the playback devices 170, the servers 180, and/or other publishing destinations. The method 400 of FIG. 4 may thus be used to automatically publish a stream to multiple publishing destinations.

Figure 5:
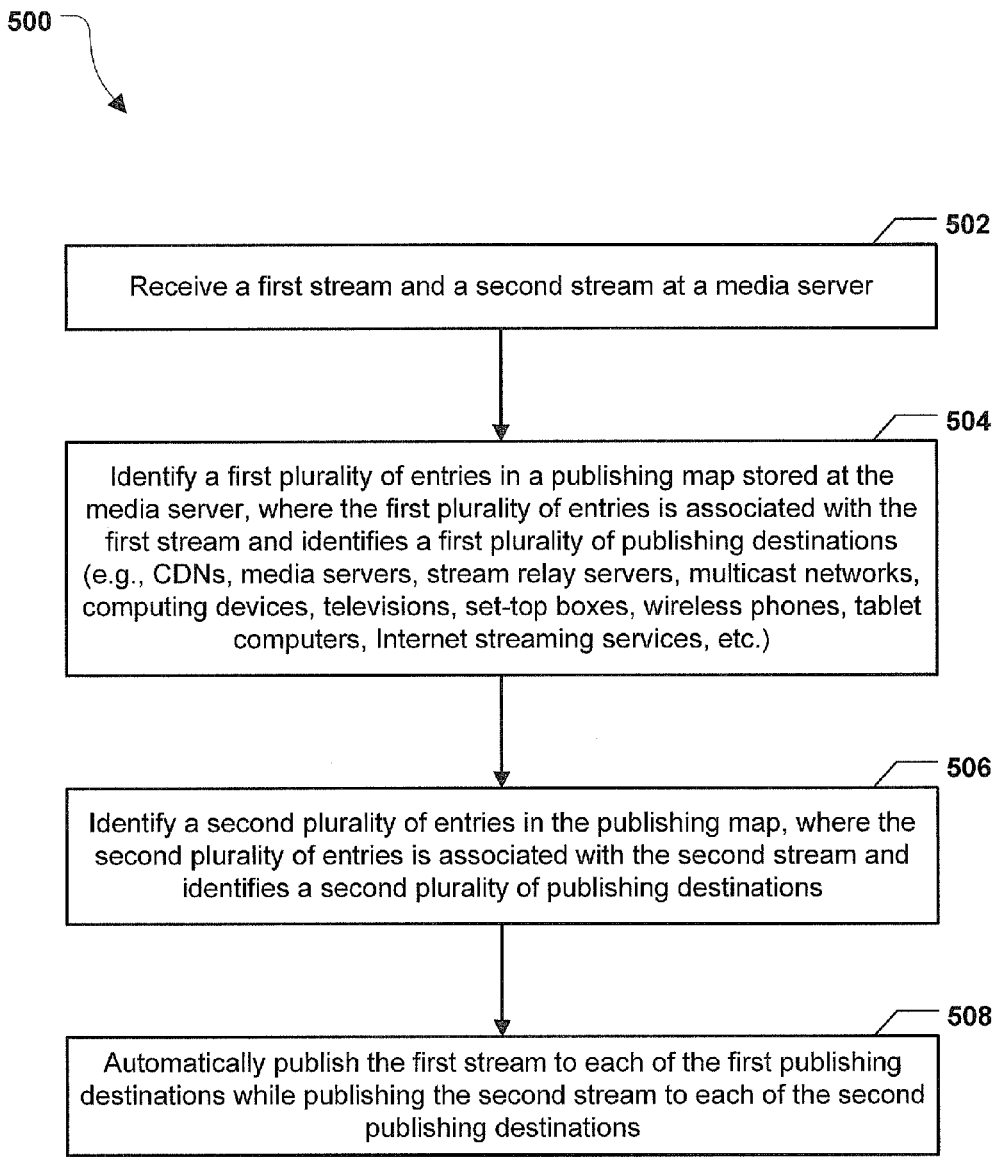
FIG. 5 is a flowchart to illustrate another particular embodiment of a method of automatically publishing a stream to multiple destinations.

FIG. 5 is a flowchart to illustrate another embodiment of a method 500 of automatically publishing streams. In an illustrative embodiment, the method 500 may be performed by the media server 150 of FIG. 1.

The method 500 may include receiving a first stream and a second stream at a media server, at 502. For example, in FIG.

1, the media server 150 may receive the first live stream 111 and the second live stream 113.

The method 500 may also include identifying a first plurality of entries in a publishing map stored at the media server, at 504. The first plurality of entries is associated with the first stream and identifies a first plurality of publishing destinations (e.g., CDNs, media servers, stream relay servers, multicast networks, computing devices, televisions, set-top boxes, wireless phones, tablet computers, Internet streaming services, etc.). The method 500 may further include identifying a second plurality of entries in the publishing map, at 506. The second plurality of entries is associated with the second stream and identifies a second plurality of publishing destinations. For example, in FIG. 1, the push publishing module 160 may identify multiple entries in the publication map 162 that match the first live stream 111 and the second live stream 113.

The method 500 may include automatically publishing the first stream to each of the first plurality of publishing destinations while publishing the second stream to each of the second plurality of publishing destinations, at 508. The first plurality of publishing destinations and the second plurality of publishing destinations may include at least one common publishing destination. Alternately, the first plurality of destinations and the second plurality of destinations may be mutually exclusive. For example, in FIG. 1, the media server 150 may publish the first live stream 111 to multiple publishing destinations while publishing the second live stream 113 to multiple publishing destinations. The method 500 of FIG. 5 may thus enable automatic publication of multiple streams to multiple destinations at the same time.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 150 of FIGS. 1-2, the desktop/laptop computing device 171 of FIG. 1, the TV/set-top box 172 of FIG. 1, the smartphone 173 of FIG. 1, the tablet computer 174 of FIG. 1, the first media server/stream relay server 181 of FIG. 1, the second media server/stream relay server 183 of FIG. 1, a server (e.g., an edge server or a publishing entrypoint server) of the first CDN 182 of FIG. 1, a server (e.g., an edge server or a publishing entrypoint server) of the second CDN 184 of FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In a particular embodiment, a method includes receiving a live stream at a media server. The method also includes identifying a plurality of entries in a publishing map stored at the media server. Each of the plurality of entries is associated with the live stream. A first entry of the plurality of entries identifies a first publishing destination and a second entry of the plurality of entries identifies a second publishing destination that is different from the first publishing destination. The method further includes automatically publishing the live stream to the first publishing destination and to the second publishing destination.

In another particular embodiment, a media server includes a network interface configured to receive a live stream, a processor, and a memory storing a publishing map. The media server also includes a push publishing module executable by the processor to identify a plurality of entries in the publishing map. Each of the plurality of entries is associated with the live stream. A first entry of the plurality of entries identifies a first publishing destination and a second entry of the plurality of entries identifies a second publishing destination that is different from the first publishing destination. The push publishing module is also executable by the processor to automatically publish the live stream to the first publishing destination and to the second publishing destination.

In another particular embodiment, a computer-readable storage device stores instructions that, when executed by a computer, cause the computer to receive a first live stream and a second live stream at a media server. The instructions, when executed by the computer, also cause the computer to identify a first entry in a publishing map stored at the media server, where the first entry is associated with the first live stream and identifies a first publishing destination. The instructions, when executed by the computer, further cause the computer to identify a second entry in the publishing map, where the second entry is associated with the second live stream and identifies a second publishing destination. The instructions, when executed by the computer, cause the computer to, after identifying the first entry and the second entry, automatically publish the first live stream to the first publishing destination and the second live stream to the second publishing destination.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
  receiving a media stream including audio content and video content at a media server;
  generating a plurality of adaptive bitrate renditions of the media stream, wherein each adaptive bitrate rendition corresponds to a particular version of the media stream;
  identifying, based on an identifier of the media stream and identifiers of the adaptive bitrate renditions, a plurality of entries in a publishing map stored at the media server, wherein the plurality of entries in the publishing map includes information to identify a video port, an audio port, timecode information, a multicast time to live, an adaptive streaming setting, and one of a host name and a host address;
  automatically publishing, based on the identified entries in the publishing map, the media stream and a first adaptive bitrate rendition of the plurality of adaptive bitrate renditions to a first publishing destination, wherein a portion of the media stream is published to the first publishing destination while a portion of the first adaptive bitrate rendition is published to the first publishing destination; and
  automatically publishing, based on the identified entries in the publishing map, the media stream and a second adaptive bitrate rendition of the plurality of adaptive bitrate renditions-to a second publishing destination, wherein the second adaptive bitrate rendition is different from the first adaptive bitrate rendition, and wherein a portion of the second adaptive bitrate rendition is published to the second publishing destination while the portion of the first adaptive bitrate rendition is published to the first publishing destination.

2. The method of claim 1, further comprising determining that an entry in the publishing map is associated with the media stream based on a match between a name of the media stream and a stream name stored in the entry.

3. The method of claim 1, wherein publishing the media stream to a particular publishing destination includes sending the media stream to the particular publishing destination using a real time messaging protocol (RTMP), a real-time transport protocol (RTP), a motion picture experts group 2 transport stream (MPEG-TS), or any combination thereof.

4. The method of claim 1, wherein the first publishing destination includes a content delivery network, another media server, a stream relay server, a multicast network, a computing device, a television or set-top box, a wireless telephone, a tablet computer, an Internet streaming service, or any combination thereof.

5. The method of claim 1, wherein at least one entry of the publishing map includes authentication information associated with a particular publishing destination, wherein the authentication information includes a user name, a password, and a stream identifier.

6. The method of claim 1, wherein each entry of the plurality of entries in the publishing map identifies one or more publishing profiles.

7. The method of claim 1, wherein the adaptive streaming setting and the timecode information correspond to a first entry of the publishing map that identifies a real time messaging protocol (rtmp) publishing profile, and wherein the video port, the audio port, and the one of the host name and the host address correspond to a second entry of the publishing map that identifies a real-time transport protocol (rtp) publishing profile.

8. A media server comprising:
  a network interface configured to receive a media stream including audio content and video content;
  a processor;
  a memory storing a publishing map including a plurality of entries, wherein each entry in the publishing map includes a stream name and identifies a publishing profile, and wherein the plurality of entries in the publishing map includes information to identify a video port, an audio port, timecode information, a multicast time to live, an adaptive streaming setting, and one of a host name and a host address;
  a transcoder configured to generate a plurality of adaptive bitrate renditions of the media stream; and
  a push publishing module executable by the processor to:
    identify, based on an identifier of the media stream and identifiers of the adaptive bitrate renditions, a plurality of entries in the publishing map;
    automatically publish, based on the identified entries in the publishing map, the media stream and a first adaptive bitrate rendition of the plurality of adaptive bitrate renditions to a first publishing destination, wherein a portion of the media stream is published to the first publishing destination while a portion of the first adaptive bitrate rendition is published to the first publishing destination; and
    automatically publishing, based on the identified entries in the publishing map, the media stream and a second adaptive bitrate rendition of the plurality of adaptive bitrate renditions to a second publishing destination, wherein the second adaptive bitrate rendition is different from the first adaptive bitrate rendition, and wherein a portion of the second adaptive bitrate rendition is published to the second publishing destination while the portion of the first adaptive bitrate rendition is published to the first publishing destination.

9. The media server of claim 8, wherein the network interface is further configured to receive a second media stream while receiving the media stream and wherein the push publishing module is further executable by the processor to automatically publish the second media stream while publishing the media stream and the first adaptive bitrate rendition.

10. The media server of claim 8, further comprising a decoder configured to decode the stream.

11. The media server of claim 8, wherein the transcoder is configured to perform coder/decoder (CODEC) conversion, frame size conversion, and bitrate conversion on the stream.

12. The media server of claim 8, wherein each publishing profile is associated with a streaming protocol and a publishing destination.

13. The media server of claim 8, wherein the memory further stores a plurality of publishing profiles.

14. The media server of claim 8, wherein each publishing profile comprises configuration attributes.

15. The media server of claim 14, wherein an entry of the publishing map that identifies a particular publishing profile includes values corresponding to configuration attributes of the particular publishing profile.

16. The media server of claim 15, wherein the particular publishing profile includes a default value for at least one of the configuration attributes of the particular publishing profile.

17. A computer-readable storage device storing instructions that, when executed by a computer, cause the computer to:
receive a media stream including audio content and video content at a media server;
generate a plurality of adaptive bitrate renditions of the media stream;
identify, based on an identifier of the media stream and identifiers of the adaptive bitrate renditions, a plurality of entries in a publishing map stored at the media server, wherein the plurality of entries in the publishing map includes information to identify a video port, an audio port, timecode information, a multicast time to live, an adaptive streaming setting, and one of a host name and a host address;
automatically publish, based on the identified entries in the publishing map, the media stream and a first adaptive bitrate rendition of the plurality of adaptive bitrate renditions to a first publishing destination, wherein a portion of the media stream is published to the first publishing destination while a portion of the first adaptive bitrate rendition is published to the first publishing destination; and
automatically publish, based on the identified entries in the publishing map, the media stream and a second adaptive bitrate rendition of the plurality of adaptive bitrate renditions to a second publishing destination, wherein the second adaptive bitrate rendition is different from the first adaptive bitrate rendition, and wherein a portion of the second adaptive bitrate rendition is published to the second publishing destination while the portion of the first adaptive bitrate rendition is published to the first publishing destination.

18. The computer-readable storage device of claim 17, further storing instructions that, when executed by the computer, cause the computer to:
publish a second media stream while publishing the media stream to the first publishing destination.

* * * * *